Jan. 23, 1962     H. O. MEIER     3,018,055
DETACHABLE SCREW CONNECTION FOR RAILS ON CONCRETE TIES
Filed May 27, 1959
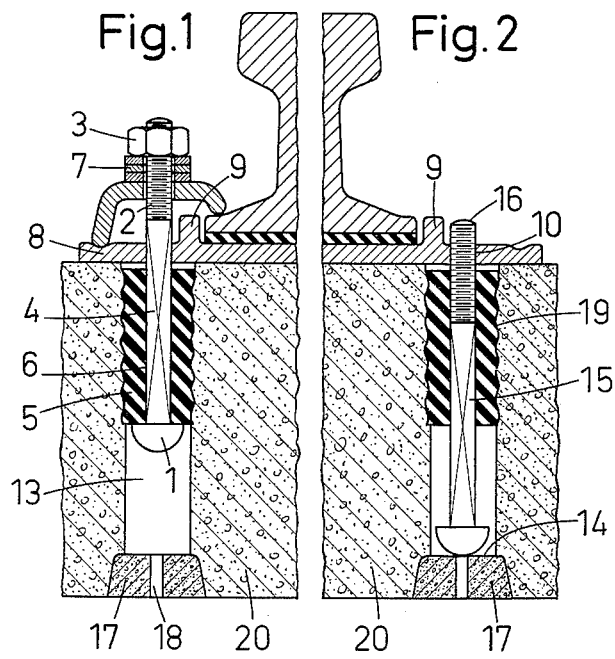
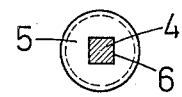
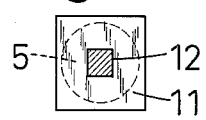
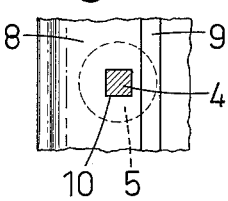
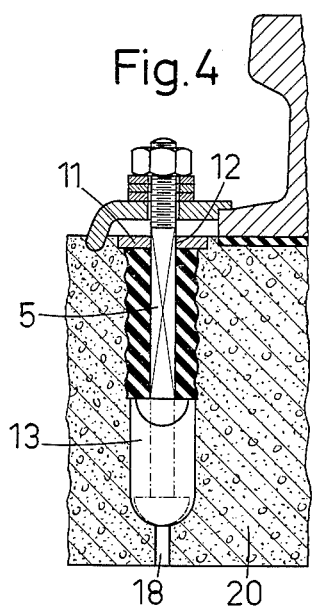
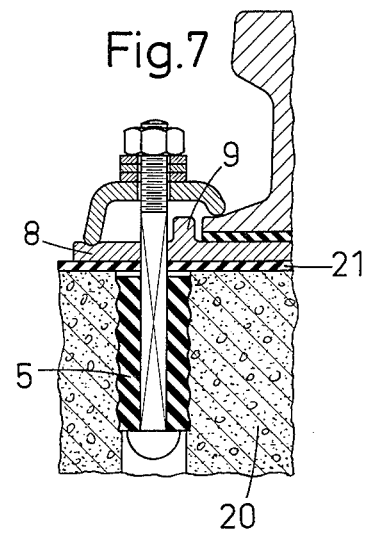
INVENTOR
Hermann Oskar Meier
BY United States Patent Office 3,018,055
Patented Jan. 23, 1962

3,018,055
DETACHABLE SCREW CONNECTION FOR RAILS ON CONCRETE TIES
Hermann Oskar Meier, Arcisstrasse 21, Munich, Germany
Filed May 27, 1959, Ser. No. 816,137
6 Claims. (Cl. 238—371)

The present invention concerns a detachable screw connection for fastening rails on concrete ties by means of a threaded dowel adapted to be screwed into and out of the upper surface of the tie, while a bolt extends through said dowel in such a manner that its head rests against the bottom portion of the dowel.

It is known for purposes of anchoring rails to employ hard wood dowels into which are screwed ordinary tie screws. This type of anchoring rails is not the best solution to the problem involved because such wooden dowels have certain disadvantages with regard to durability, resistance against withdrawal, and deformation. Moreover, a wooden dowel is also frequently not satisfactory with regard to electric insulation, especially if high requirements as to electric insulation are to be met.

It is, therefore, an object of the present invention to provide a detachable screw connection for rails and concrete ties, which will overcome the above mentioned drawbacks.

It is another object of this invention to provide a screw connection of the above mentioned type which is easily disconnectable and exchangeable.

It is also an object of this invention to provide a detachable screw connection as set forth above, which will have a high resistance against accidental removal of the screw connection from the tie.

These and other objects and advantages of the invention will appear more clearly from the following specification in connection with the accompanying drawings, in which:

FIGS. 1 and 2 represent a longitudinal section through a screw connection according to the invention while employing a washer plate.

FIG. 3 is a plan view of a threaded dowel for use in connection with the rail connections according to the invention.

FIG. 4 is a vertical section through a modified rail connection according to the invention.

FIG. 5 is a section along the line V—V of FIG. 4.

FIG. 6 is a section along the line VI—VI of FIG. 1.

FIG. 7 is a vertical section through a modified rail connection according to the invention while employing an intermediate plate.

The present invention employs a threaded dowel adapted to be screwed into or out of the upper surface of a tie, while a threaded bolt extends axially through said dowel in such a way that the head of the bolt rests against the lower surface of said dowel. The invention is characterized primarily in that the bore through the threaded dowel, and the shank of the threaded bolt have a circumferential contour differing from the contour of a circle but have substantially a similar contour shape. Furthermore, according to the present invention, the shank of the threaded bolt has such a length that it protrudes upwardly beyond the threaded dowel while the shank of said threaded bolt is above said threaded dowel secured against undesired rotation.

Advantageously, the threaded dowel is made of a material having a high mechanical strength and having high electric insulating properties. As such material may be used for instance hard rubber, synthetic material as for instance polyurethanes or the like. Inasmuch as the threaded bolt extends through the threaded dowel and by means of its head rests from below against the threaded dowel, the latter can be made short in view of this power transfer so that it will be cheap in manufacture.

The bore of the threaded dowel and the shank of the threaded bolt may have a circumferential contour different from the contour of a circle. However, the contour of the bolt and the dowel may be similar to each other so that the bore of the dowel and the shank of the threaded bolt will fit together and both will have the same non-circular cross section. In this way a relative rotation between the said bolt and dowel will be impossible. The threaded dowel may thus by means of the threaded bolt be screwed into the tie body from the top of the tie or may be screwed out of the tie body. The torque will in this connection be distributed over the entire shank. Furthermore, the threaded dowel and the threaded bolt are together secured against rotation, namely by resting the shank of the threaded bolt above the threaded dowel. To this end, that portion of the bolt shank which is located above the threaded dowel is held against rotation and connected to the fixed portions of the remaining rail fastening elements, for instance the rail washer. In addition thereto, also that portion of the threaded bolt shank which is located above the threaded dowel may be connected to a stationary body, for instance a plate, while said stationary body is detachably connected to the concrete tie but is again secured against rotation.

Referring now to the drawings in detail, the threaded bolt is provided with a head 1, a thread 2 with nut 3 and a shank 4 of a square-shaped cross section. The threaded dowel 5 has a longitudinal bore therethrough with substantially the same square cross section as shank 4. Shank 4 fits properly into the longitudinal bore of dowel 5. The clamping or tightening force of the threaded bolt is secured by a spring ring 7. Head 1 of said threaded bolt rests from below against the threaded dowel 5 which latter is provided with an outer thread 19 engaging a corresponding thread in a recess 13 of the concrete tie 20 so that the threaded dowel 5 can be screwed in and out of the tie.

The arrangement furthermore comprises a washer plate 8 with guiding ribs 9. Said washer plate 8 is provided with bores 10 preferably of square shape (FIG. 6) for receiving shank 4 and securing the same against rotation.

According to the embodiment shown in FIG. 4, a plate 11 of solid material, such as steel, is inserted into the top portion of tie 20. This plate 11 will in case a rail connection without washer plate 8 is employed, secure the threaded dowel 5 and shank 4 against rotation. The plate 11 which is locked in the concrete tie 20 has a square hole 12 corresponding to the cross section of shank 4.

It is a matter of course that with the embodiment according to FIGS. 1 and 2 an intermediate plate 21 as shown in FIG. 7 may be interposed between the washer plate 8 and the concrete tie 20 if this should be desired for reasons of obtaining an electric insulation. Such intermediate plate will insulate the washer plate 8 with regard to the concrete tie 20, whereas the insulation of shank 4 and head 1 with regard to tie 20 will be effected by the threaded dowel 5.

Of particular importance is the recess 13 of the concrete tie 20. The cross section of this recess is somewhat greater than the cross section of head 1, and the depth of this recess 13 is so dimensioned that the threaded bolt will still be held in its lowest position by the threaded dowel 5 and will have its upper end slightly extended beyond the upper surface of the concrete tie 20 or the upper surface of washer plate 8 as is shown in FIG. 2. By counter sinking the threaded bolt, the advantage is obtained that when laying the rail, the otherwise considerably protruding thread 2 will be protected against damage. Furthermore, when employing a washer plate 8, such plate can without any difficulties be exchanged below the rail which fact is of particular importance when welding the rails together without a gap therebetween.

Summarizing the advantages of the rail connection according to the present invention, it may be said that the same is technically and economically superior to heretofore known screw connections of the type involved. The connection or anchoring of the rails to the ties is detachable and exchangeable. The resistance offered when removing the connection from the tie body is high. The connection furthermore has a very high degree of safety so that it will be able to withstand rough handling. The connecting elements will even under considerable force deform only very slightly so that the initially applied preload between rail and tie will be retained for a long time. The spring ring for maintaining the tension may be of relatively low cost and may be cheap in manufacture.

It is, of course, to be understood that the present invention is, by no means, limited to the particular construction shown in the drawing but also comprises any modifications within the scope of the appended claims.

What I claim is:

1. In a detachable screw connection for connecting rails to a concrete tie provided with a plurality of substantially vertical threaded bores extending into the tie from the upper surface thereof: a plurality of dowels respectively located completely within said bores and detachably threadedly engaging the same, each of said dowels having an axial bore therethrough of a polygonal cross section, a plurality of threaded bolts respectively extending through the bores of said dowels, each of said bolts having a shank with a cross section substantially corresponding to the cross section of the respective axial bore receiving the respective bolt and longer than said bore and each bolt being provided with a head resting from below against the lower end of the respective adjacent dowel, said bolts being availed of for threading the dowels into their respective bores, each said bore having a bottom and the length of said bolts being such as respectively to protrude upwardly beyond the upper end of said dowel, and non-rotatable means for securing said bolts above each said dowel having a polygonal aperture receiving the respective bolt to hold the bolt against rotation.

2. In a detachable screw connection for connecting rails to a concrete tie provided with a plurality of substantially vertical threaded bores extending into the tie from the upper surface thereof: a plurality of dowels respectively located completely within said bores and detachably threadedly engaging the same, each of said dowels having an axial bore therethrough of a polygonal cross section, a plurality of threaded bolts respectively extending through the bores of said dowels, each of said bolts having a shank with a cross section substantially corresponding to the cross section of the respective axial bore receiving the respective bolt and longer than said bore and each bolt being provided with a head resting from below against the lower end of the respective adjacent dowel, the length of said bolts and the depths of said bores being such that the upper ends of the bolts always protrude upwardly beyond the upper ends of said dowels, and washer plate means non-rotatively mounted on the upper surface of said tie above each said dowel and provided with polygonal bores corresponding to the contour of said bolts for receiving said shanks when the bolts are drawn upwardly in the dowels for preventing the bolts from turning.

3. In a detachable screw connection for connecting rails to a concrete tie provided with a plurality of substantially vertical threaded bores extending into the tie from the upper surface thereof: a plurality of dowels respectively located completely within said bores and detachably threadedly engaging the same, each of said dowels having an axial bore therethrough of a polygonal cross section, a plurality of threaded bolts respectively extending through the bores of said dowels, each of said bolts having a shank with a cross section substantially corresponding to the cross section of the respective axial bore receiving the respective bolt and being provided with a head resting from below against the lower end of the respective adjacent dowel, each shank being longer than the respective dowel, the length of said bolts and the depths of said bores being such that the upper ends of the bolts always protrude upwardly beyond the upper ends of said dowels, and plate means detachably but non-rotatably mounted on said tie on the top thereof and provided with polygonal bores corresponding to the cross section of the shanks of said bolts for receiving said shanks when the bolts are drawn upwardly in the dowels for preventing the bolts from turning.

4. In a detachable screw connection for connecting rails to a concrete tie provided with a plurality of substantially vertical threaded bores extending into the tie from the upper surface thereof: a plurality of dowels respectively located completely within said bores and detachably threadedly engaging the same, each of said dowels having an axial bore therethrough of a polygonal cross section, a plurality of threaded bolts respectively extending through the bores of said dowels, each of said bolts having a shank with a cross section substantially corresponding to the cross section of the respective axial bore receiving the respective bolt longer than said bore and each bolt being provided with a head resting from below against the lower end of the respective adjacent dowel, the bores in said concrete ties being sufficiently wide to be able to receive the respective head of said bolts, each said bores having a bottom so located that the bolts in their lowest position still slightly protrude upwardly beyond the upper surface of said ties so as to be able to be grasped from the outside, and non-rotatable means for securing said bolts carried by the tie above said dowels having polygonal aperture means to receive the shanks of the bolts to hold the bolts against rotation when the bolts are drawn upwardly in the dowels.

5. A screw connection according to claim 4 in which said non-rotatable means is a non-circular washer imbedded in the tie at the top of the dowel.

6. A screw connection according to claim 4 in which said non-rotatable means is a plate extending across the tie on top thereof and at least two of the said polygonal apertures therein in respective register with spaced ones of said dowels.

References Cited in the file of this patent

UNITED STATES PATENTS

| | | |
|---|---|---|
| 698,070 | Stahl | Apr. 22, 1902 |
| 862,898 | Forsyth | Aug. 13, 1907 |
| 1,294,778 | Cutting | Feb. 18, 1919 |
| 1,432,243 | Harris | Oct. 17, 1922 |
| 1,696,131 | Vagneux | Dec. 18, 1928 |
| 1,855,329 | Wagner | Apr. 26, 1932 |
| 1,886,265 | Andreianov | Nov. 1, 1932 |

FOREIGN PATENTS

| | | |
|---|---|---|
| 187,541 | Austria | Jan. 15, 1956 |
| 810,031 | Germany | Mar. 24, 1952 |
| 312,035 | Great Britain | June 27, 1929 |